(12) United States Patent
Lederer et al.

(10) Patent No.: US 7,785,037 B2
(45) Date of Patent: Aug. 31, 2010

(54) SPILLWAY HYDROELECTRIC TURBINE

(76) Inventors: Gary Lederer, 70 Sarver La., Wexford, PA (US) 15090; Roseann Lederer, 70 Sarver La., Wexford, PA (US) 15090

( * ) Notice: Subject to any disclaimer, the term of this patent is extended or adjusted under 35 U.S.C. 154(b) by 185 days.

(21) Appl. No.: 12/128,195

(22) Filed: May 28, 2008

(65) Prior Publication Data

US 2008/0296900 A1    Dec. 4, 2008

Related U.S. Application Data

(60) Provisional application No. 60/932,022, filed on May 29, 2007, provisional application No. 61/070,956, filed on Mar. 27, 2008.

(51) Int. Cl.
  *E02B 9/00*    (2006.01)
  *F03B 7/00*    (2006.01)
  *F03B 13/00*   (2006.01)

(52) U.S. Cl. ............................... 405/78; 405/75; 290/54

(58) Field of Classification Search .................. 405/75, 405/76, 77, 78, 107, 108; 290/53, 54
  See application file for complete search history.

(56) References Cited

U.S. PATENT DOCUMENTS

| | | | |
|---|---|---|---|
| 2,097,286 A | 10/1937 | McGee | |
| 2,163,102 A | 6/1939 | Odill | |
| 2,753,690 A * | 7/1956 | Campbell | 405/78 |
| 3,993,913 A * | 11/1976 | Dickman | 290/53 |
| 4,150,301 A | 4/1979 | Bergey, Jr. | |
| 4,241,283 A | 12/1980 | Storer, Sr. | |
| 4,516,033 A | 5/1985 | Olson | |
| 4,636,141 A | 1/1987 | Sedlacek | |
| 4,717,831 A | 1/1988 | Kikuchi | |
| 5,032,038 A * | 7/1991 | Lemperiere | 405/108 |
| 5,311,064 A * | 5/1994 | Kumbatovic | 290/53 |
| 5,430,332 A | 7/1995 | Dunn, Jr. | |
| 5,440,175 A | 8/1995 | Mayo, Jr. et al. | |
| 5,735,665 A | 4/1998 | Kang | |
| 5,882,143 A | 3/1999 | Williams, Jr. | |
| 5,947,678 A * | 9/1999 | Bergstein | 415/3.1 |
| 6,208,037 B1 * | 3/2001 | Mayo et al. | 290/54 |
| 6,616,403 B1 * | 9/2003 | Smith et al. | 415/3.1 |
| 7,357,622 B2 | 4/2008 | Corten et al. | |
| 7,429,803 B2 * | 9/2008 | Davis | 290/54 |
| 7,503,744 B1 * | 3/2009 | Broome | 415/3.1 |

FOREIGN PATENT DOCUMENTS

JP    2003269310 A  *  9/2003

* cited by examiner

*Primary Examiner*—Frederick L Lagman
(74) *Attorney, Agent, or Firm*—McNees Wallace & Nurick, LLC

(57) ABSTRACT

A hydroelectric system comprising a support member, a rotational torque converter, a drive member being disposed at one end of a support arm, a water driven mechanism in rotational communication with the drive member, wherein the support arm can be pivotally adjusted by a retraction mechanism are disclosed. A spillway deflector comprising a spillway deflector wedge, a deflector anchor, and a flat portion extending between the deflector anchor and the deflector wedge are disclosed.

22 Claims, 8 Drawing Sheets

SPILLWAY HYDROELECTRIC TURBINE

CROSS REFERENCE TO RELATED PATENT APPLICATIONS

This application claims the benefit of U.S. Provisional Application No. 60/932,022, filed May 29, 2007, which is hereby incorporated by reference in its entirety, and U.S. Provisional Application No. 61/070,956, filed Mar. 3, 2008, which is hereby incorporated by reference in its entirety.

FIELD OF THE INVENTION

The present invention is directed to a hydroelectric system and more particularly to a spillway hydroelectric system.

BACKGROUND OF THE INVENTION

Hydroelectric energy has been used for many years to produce electrical power. Many sources of hydroelectric power involve water flowing through piping and water systems which drive electrical generators. Other sources of hydroelectric power involve water wheels.

The sources of hydroelectric power involving water flowing through piping and water systems suffer from the drawback that large dams and large elevation changes are required for sufficient head pressure to produce hydroelectric power.

The sources involving known water wheels suffer from the drawback that they lack sufficient efficiency to economically produce hydroelectric power.

In the past, the lack of efficiency of known water wheels has been addressed by constructing elaborate structures permitting the water wheel to be subjected to greater head pressure. For instance, elaborate structures including rail members adapted for transfer carriers moving along the rail members have been suggested. These structures do not provide enough adjustability and include parts which are subject to mechanical deterioration.

What is needed is a hydroelectric system which has sufficient head pressure, sufficient durability, and sufficient adjustability, but does not require large dams or large elevation changes.

SUMMARY OF THE INVENTION

This invention provides for a source of hydroelectric power which is able to be adjusted to increase head pressure, which is durable, and does not require large dams or large elevation changes.

According to an embodiment of the invention, a hydroelectric generator arrangement including a drive member being disposed at one end of a support arm, the drive member being operably connected to a generator, a water driven mechanism disposed along the support arm in rotational communication with the drive member, and a retraction mechanism arranged and disposed to position the support arm is disclosed.

According to another embodiment of the invention, a hydroelectric system including a drive member being disposed at one end of a support arm, the drive member being operably connected to a generator, a water driven mechanism disposed along the support arm in rotational communication with the drive member, a retraction mechanism arranged and disposed to position the support arm, a spillway or dam, and a spillway deflector is disclosed.

According to another embodiment of the invention, a spillway deflector including a spillway deflector wedge, a deflector anchor, and a flat portion extending between the deflector anchor and the deflector wedge is disclosed.

One advantage of an embodiment of the present disclosure includes sufficient adjustability to retrofit existing dams or spillways with a hydroelectric system.

Another advantage of an embodiment of the present disclosure includes the ability to increase efficiency of a hydroelectric system by adjusting the position of the water wheel.

Another advantage of an embodiment of the present disclosure includes the ability to increase efficiency of a hydroelectric system by increasing head pressure by means of a deflector.

Another advantage of an embodiment of the present disclosure includes the ability to increase efficiency of a hydroelectric system while avoiding costly and elaborate systems.

Another advantage of an embodiment of the present disclosure includes diverting water to increase head pressure in specific areas.

Further aspects of the method and system are disclosed herein. The features as discussed above, as well as other features and advantages of the present invention will be appreciated and understood by those skilled in the art from the following detailed description and drawings.

DESCRIPTION OF THE DRAWINGS

Wherever possible, the same reference numbers will be used throughout the drawings to represent the same parts.

DETAILED DESCRIPTION OF THE INVENTION

The present invention now will be described more fully hereinafter with reference to the accompanying drawing, in which a preferred embodiment of the invention is shown. This invention may, however, be embodied in many different forms and should not be construed as limited to the embodiments set forth herein; rather, these embodiments are provided so that this disclosure will be thorough and complete and will fully convey the scope of the invention to those skilled in the art.

Figure 1:
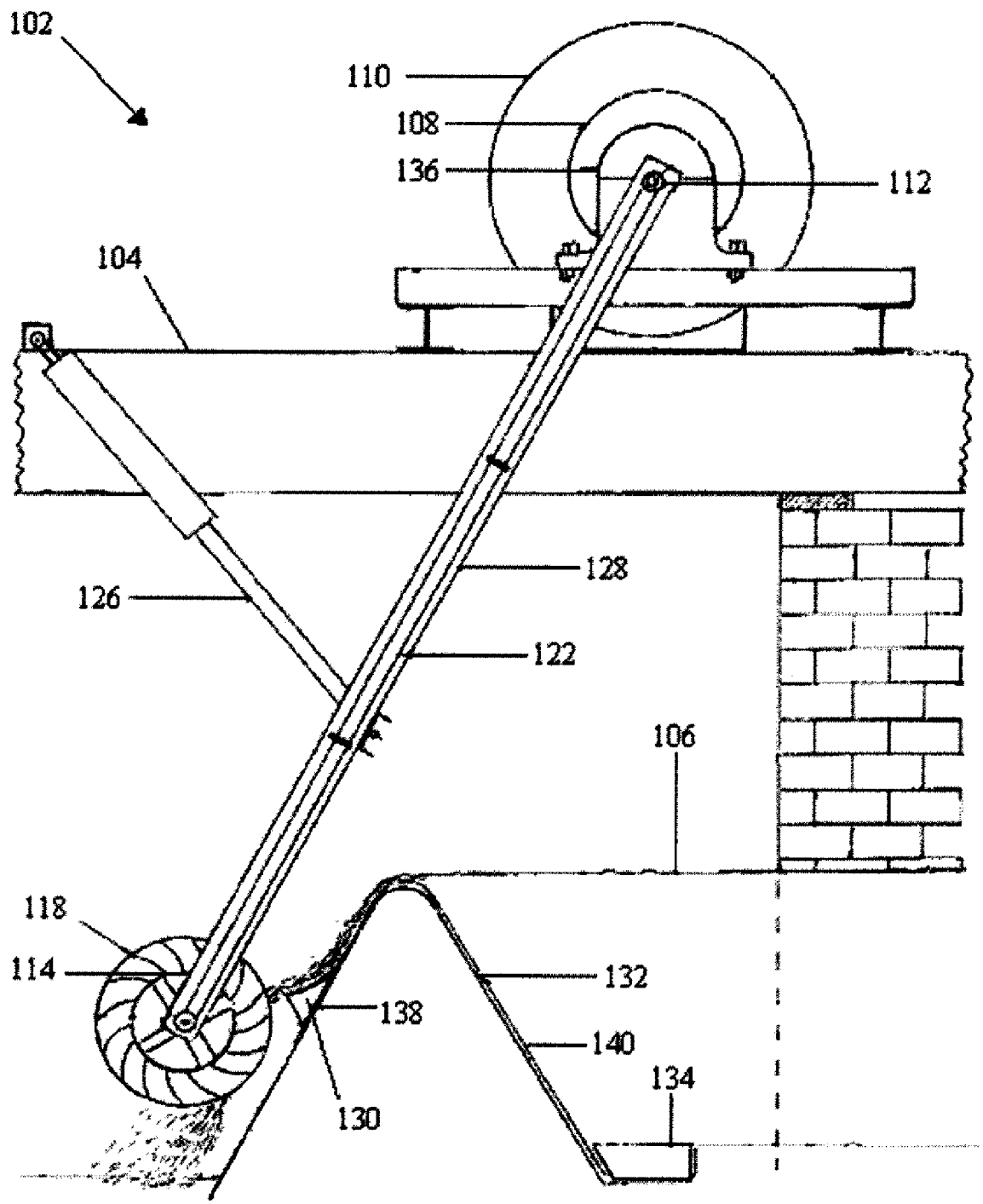
FIG. 1 illustrates a side view of the hydroelectric system according to an embodiment of the present invention.

FIG. 1 illustrates a side view of an embodiment of the present invention wherein the hydroelectric system 102 includes a support member 104, a gear arrangement 108, a generator 110, a drive member 112, a support arm 128, and a retraction mechanism 126. In this embodiment, the support member 104 extends across a body of flowing water 106. In other embodiments, the support member does not extend across a body of flowing water but extends over an area of stagnant water or over land. In the embodiment illustrated in FIG. 1, the support member 104 is a structure with a substantially planar surface extending over the water 106. In other embodiments, the structure is a steel plate, a trestle, a concrete slab with supports in the water, or any other bridge-like structure. In the embodiment illustrated in FIG. 1, the support member 104 is configured to permit the gear arrangement 108 and the generator 110 to be on the support member 104. In another embodiment, the gear arrangement 108 and the generator 110 are housed on a separate structure. In yet another embodiment, the gear arrangement 108 and the generator 110 are on a support member 104 located on land. In this embodiment, the drive member 112 includes a lateral drive shaft extending across the flowing water 106. In the embodiments including the support member 104 as a support for the gear arrangement 108, the support member 104 must be of a sufficient strength to support the weight of the gear arrangement 108. In the embodiments including the support member 104 as a support for the generator 110, the support member 104 must be of a sufficient strength to support the weight of the generator 110. In embodiments with the support member 104 extending over flowing water, the support member 104 must be of a sufficient stability to withstand environmental stressors associated with flowing water. In one embodiment, a bridge-like structure is used as the support member 104. In another embodiment, a platform on land adjacent to a flowing body of water is used as the support member 104. In other embodiments with the gear arrangement 108 and the generator 110 positioned on land, the support member 104 does not require the same amount of strength.

In the embodiment illustrated in FIG. 1, the gear arrangement 108 is arranged and disposed between the generator 110 and the drive member 112. The gear arrangement 108, the generator 110, and the drive member comprise a rotational torque converter. The gear arrangement depicted in FIG. 1 may operate at about 15 revolutions per minute with a gear reduction ratio of 3 to 1 or 4 to 1. This gear reduction ratio is based upon 45 to 60 revolutions per minute of a water driven mechanism, which is the preferred rotational velocity of the water driven mechanism. As will be understood by those skilled in the art, the gear reduction ratio can be modified to correspond to changes in the desired rotational velocity. The preferred gear reduction ratio permits the use of existing high efficiency turbines that include commercially available variable speed gear box, such as a wind turbine variable speed gear box. The gear arrangement 108 is configured to communicate rotational torque from the drive member 112 to the generator 110. The generator 110 depicted in the embodiment illustrated by FIG. 1 is an asynchronous generator with a squirrel cage or a slip-ring rotor including water-jacket cooling or air heat exchanger. The generator 110 is configured to convert the rotational torque into electrical power. In other embodiments, as will be understood by those skilled in the art, other generators are used. In alternate embodiments, the gear arrangement 108 and generator 110 may be replaced with other rotational torque converter arrangements which translate rotational torque into power.

As illustrated in FIG. 1, the drive member 112 is rotated in response to torque transferred from the water wheel structure 118. The drive member 112 depicted in the embodiment illustrated in FIG. 1 is a steel shaft with keyways on both ends and is inserted into center rotational bearings of a cradle bearing 136 (further described in FIG. 2). In this embodiment, the flow of water rotates the drive member 112 by rotating a water wheel structure 118, which is disposed at the bottom end of the support arm 128 and which drives the drive shaft 122, which is in rotational communication with the drive member 112. The drive shaft 122 depicted in FIG. 1 is of a similar construction to a conventional automobile drive shaft. The water wheel structure 118 can be any sort of water driven mechanism including, but not limited to, the water wheel disclosed in U.S. Pat. No. 5,882,143, field May 19, 1997, which is incorporated by reference in its entirety. In another embodiment, the drive member 112 is a steel cylinder housed within a larger steel post that does not rotate. In this other embodiment, the drive shaft 122 is in rotational communication with the drive member 112 but not with the larger steel cylinder.

As shown in the embodiment illustrated in FIG. 1, the support arm 128 extends from the support member 104 in a substantially parallel relationship with a hydraulic stream to below the apex of the dam or spillway 132. In one embodiment, the support member 104 is not substantially parallel. In one embodiment, the support member 104 does not extend below the apex of the dam or spillway 132. In another embodiment, the support member 104 immediately precedes the dam or spillway 132. In the embodiment with a substantially parallel arrangement, a greater efficiency is permitted by increasing head pressure and/or by increasing efficiency. The support arm 128 depicted in the embodiment illustrated in FIG. 1 includes an annular housing 114 and the drive shaft 122. In this embodiment, the annular housing 114 is arranged such that the heat from exhaust at the generator 110 is transferred into the annular housing 114 and transported to the water wheel structure 118. In a preferred embodiment, the annular housing 114 is comprised of spiral sheet metal lined insulated duct to avoid issues relating to high temperature. In another embodiment, PVC is used for the annular housing 114. In yet another embodiment Acrylonitrile Butadiene Styrene (ABS) piping is used for the annular housing 114. In another embodiment, the support arm 128 is a C-channel. In another embodiment, the support arm 128 is a steel post housing the drive shaft 122. In yet another embodiment, the support arm 128 may be an I-beam. The support arm 128 is configured to support the water wheel structure 118, or in other embodiments, other mechanisms or structures, for harnessing the energy of the hydraulic stream.

The support arm 128 in the embodiment illustrated by FIG. 1 is depicted as able to be pivotally adjusted by the retraction mechanism 126. The retraction mechanism 126 in FIG. 1 is a hydraulic arm pivotally mounted to the support arm 128 and pivotally mounted to the support member 104. The retraction mechanism 126 is not so limited and may include any arrangement that permits pivoting or other motion of the support arm 128. In another embodiment, the system may include a steel cable affixed to the support arm on one end of the steel cable and a winding mechanism such as a winch on the other end of the steel cable. In yet another embodiment the retraction mechanism 126 may be pivotally mounted or affixed to a separate structure such as a post running across the body of water. In the embodiment illustrated in FIG. 1, the retraction mechanism 126 is configured to retract thereby pivoting the support arm 128. The pivoting of the support arm 128 permits the water wheel structure 118 to be positioned in a manner providing a desirable head pressure and/or more efficiency from water flowing over the dam or spillway 132.

FIG. 1 further illustrates the inclusion of a spillway deflector 138 to further maximize the head pressure by redirecting the hydraulic stream to maximize the force of the water driving the water wheel structure 118. In other embodiments, the spillway deflector 138 is not included. The spillway deflector 138 may be fabricated from any rubberized polymer but could be made of any flexible material (further described in FIG. 3). As depicted in the embodiment illustrated by FIG. 1, the spillway deflector 138 includes a deflector wedge 130, a deflector anchor 134, and a flat portion 140 extending between the deflector anchor 134 and the deflector wedge 130. In the embodiment illustrated in FIG. 1, the deflector anchor 134 is embedded into the ground in front of the dam or spillway 132. In other embodiments, the deflector anchor 134 is embedded into the dam or spillway 132. In other embodiments, any sort of positioning of the deflector anchor 134 that permits the flow of water over the flat portion 140 of the spillway deflector 138 are used. The flat portion 140 is configured to abut the dam or spillway 132 thereby permitting the flow of water over the flat portion 140 and over the apex of the dam or spillway 132. The deflector wedge 130 is configured to force the hydraulic stream to flow through the water wheel structure 118 or other water driven mechanism at the most efficient orientation. In one embodiment, the angle of the deflector wedge 130 can be modified by increasing or decreasing the amount of air in a chamber 302 (shown in FIG. 3), which is substantially similar to a heavy duty inner tube to a tire but could be any inflatable structure housed within the deflector wedge 130, within the deflector wedge 130 to better position the flow of the hydraulic stream. When the amount of air in the chamber 302 is increased, the deflector wedge 130 increases in size thereby increasing its angle. In another embodiment, a worm gear housed within the chamber 302 permits the adjustment of the angle of the deflector wedge 130. The preferred angle of the deflector wedge 130 is dependent upon the direction that the water driven mechanism, which in FIG. 1 is depicted as a water wheel, rotates (if it is a water driven mechanism relying upon rotation), the amount of water flowing over the dam or spillway 132, the speed of the water flowing over the dam or spillway 132, the amount and type of debris that flows over the spillway, and distance between the apex of the dam or spillway 132 and the surface of the water downstream from the dam or spillway 132.

Figure 2:
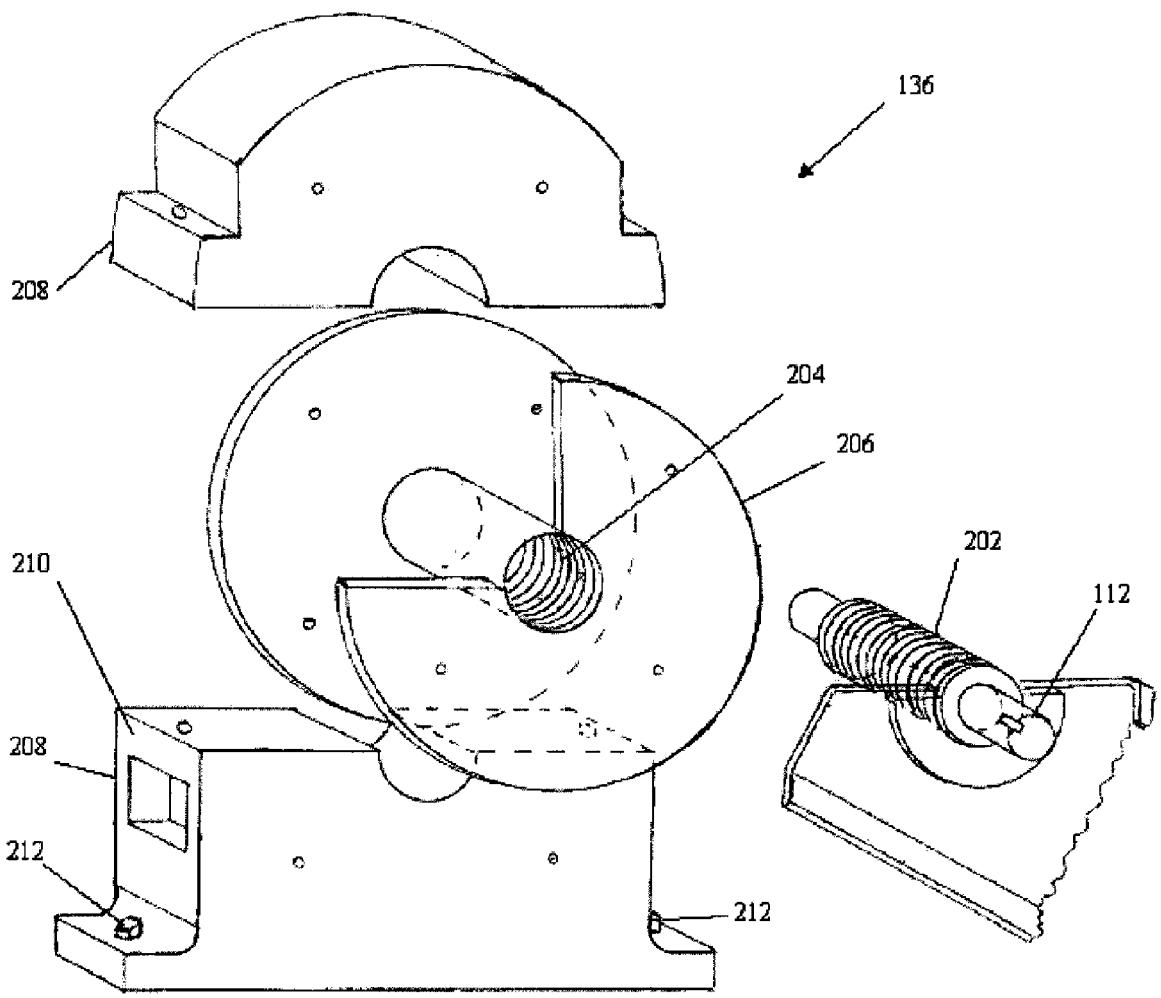
FIG. 2 illustrates an exploded perspective view of a cradle bearing according to an embodiment of the present invention.

FIG. 2 illustrates an embodiment of cradle bearing 136 which is configured to support the drive member 112. In this embodiment, the cradle bearing 136 provides the ability to rotate, pivot, and support the weight of the support arm 128. In FIG. 2, a separate cylindrical threading 202 is circumferentially attached to the drive member 12 and is configured to threadedly attach to a threaded opening 204 in an internal housing 206 of the cradle bearing 136. The internal housing 206 is configured to be housed within an external housing 208 of the cradle bearing 136. As depicted in the embodiment illustrated in FIG. 1 and FIG. 2, the cradle bearing 136 is mounted onto the support member 104 by bolts 212 and/or welded connections on an external housing base 210. The cradle bearing 136 is necessary to permit the use of the support arm 128 in an orientation substantially parallel to the flow of the water. The cradle bearing 136 allows the retraction mechanism to modify the position of the support arm 128 without significant mechanical adjustments to the rotational torque converter. The necessity of making mechanical adjustments to the rotational torque converter decreases the ease of adjusting the position of the water wheel structure 118. This decrease in ease of adjustability decreases the ability to increase efficiency and increase head flow.

Figure 3:
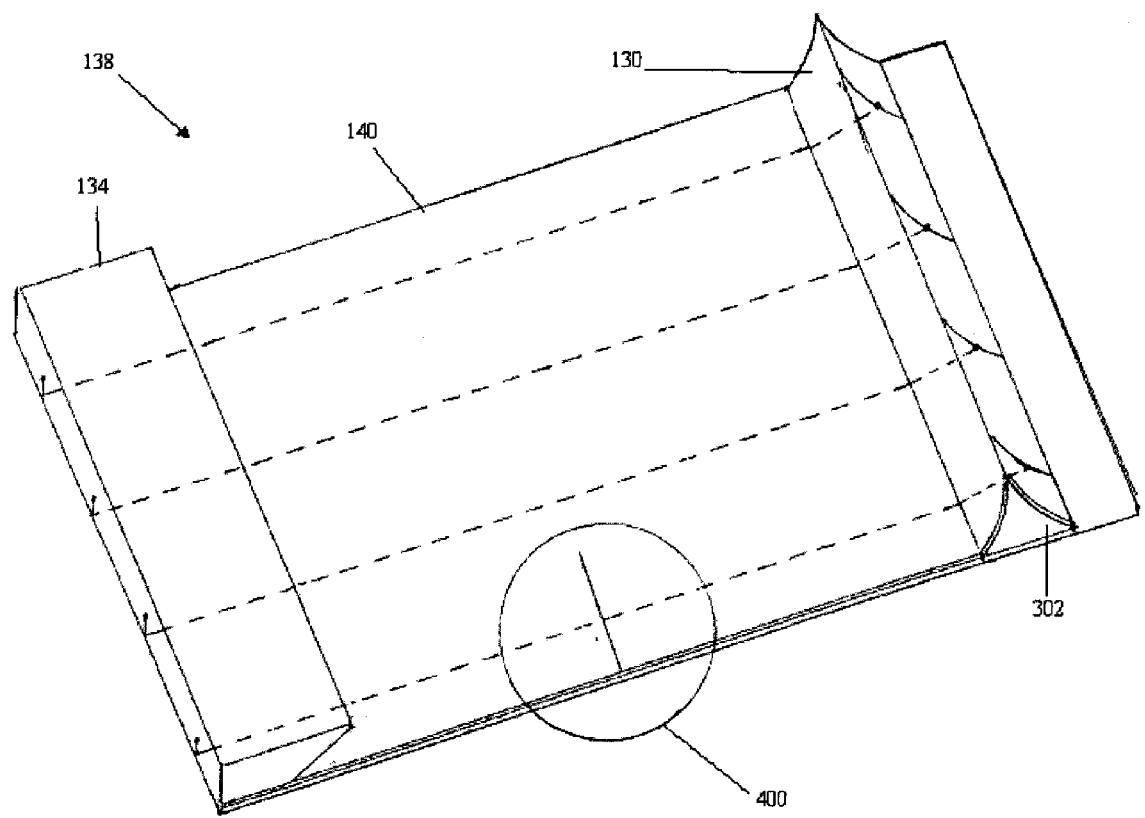
FIG. 3 illustrates a perspective view of an embodiment of the spillway deflector according to an embodiment of the present invention.
Figure 4:
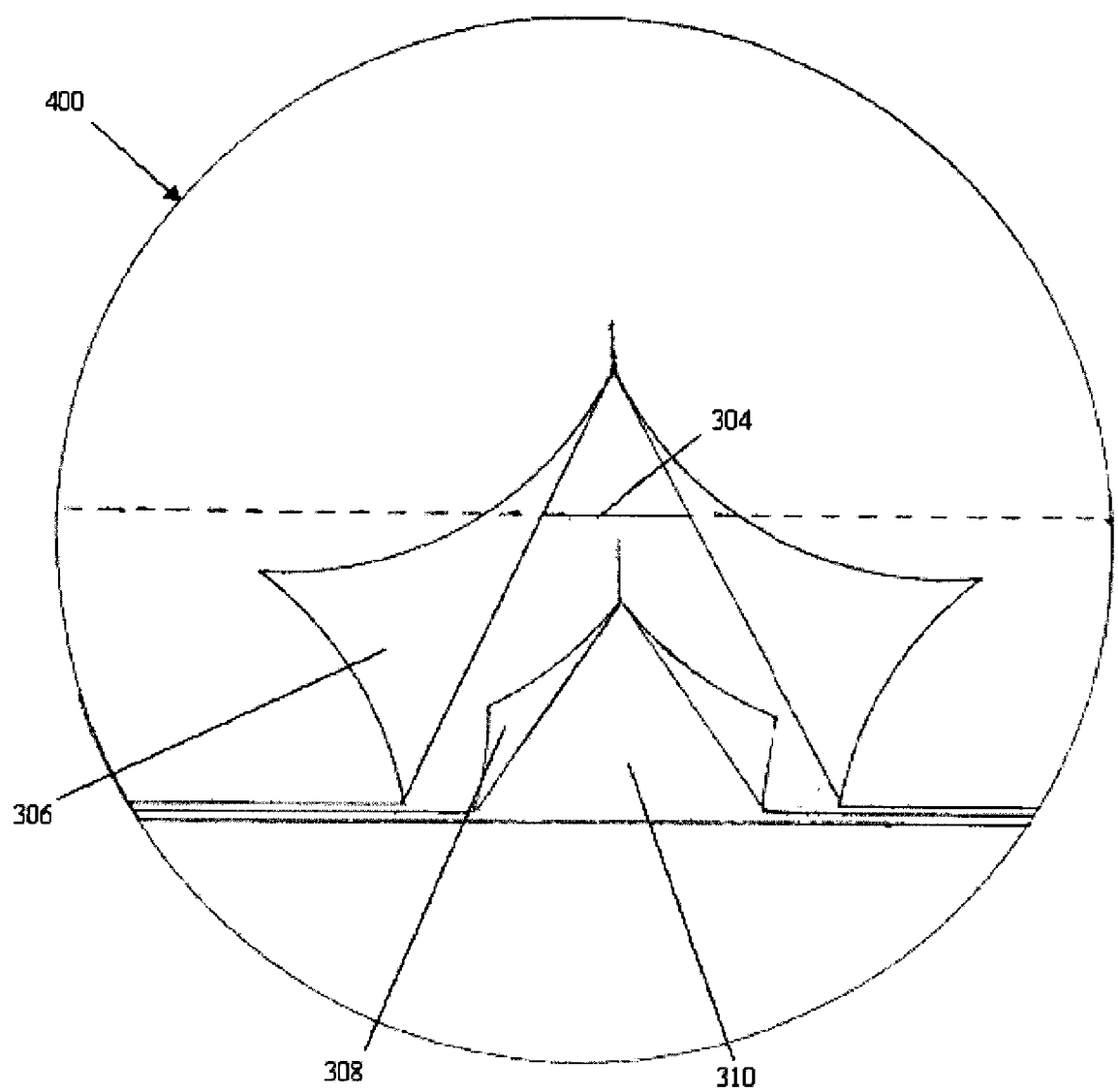
FIG. 4 illustrates a magnified top view of the portion 400 identified in FIG. 3.

FIGS. 3 and 4 illustrate an embodiment of the spillway deflector 138. In the embodiment illustrated by FIGS. 3 and 4, the spillway deflector 138 is made of a rubberized polymer. FIG. 4 represents a blown up portion 400 of FIG. 3. In other embodiments, the spillway deflector 138 is made of plastic sheeting, recycled tires, or other synthetic materials not adversely affected by being constantly immersed in water. As discussed above, the spillway deflector 138 includes the spillway the deflector wedge 130, the deflector anchor 134, and the flat portion 140 extending between the deflector anchor 134 and the deflector wedge 130. Also mentioned above, as an optional element, this embodiment of the spillway deflector 138 may include chamber 302. FIGS. 3 and 4 also illustrate an embodiment including at least one reinforcing cable 304 (only visible in FIG. 4), which is another optional element. In this embodiment, the at least one reinforcing cable 304 is connected to the deflector anchor 134 on one end and the deflector wedge 130 on the other end. As illustrated in FIG. 4, the reinforcing cable 304 runs below the first layer 306 of the spillway deflector 138 and above the second layer 308, which is above the third layer 310. The first layer 306 must be sufficiently durable to withstand impact from debris present in the flowing water 106. The third layer 310 must be sufficiently durable to withstand the friction associated with being in potentially abrasive contact with the dam or spillway 132.

Figure 5:
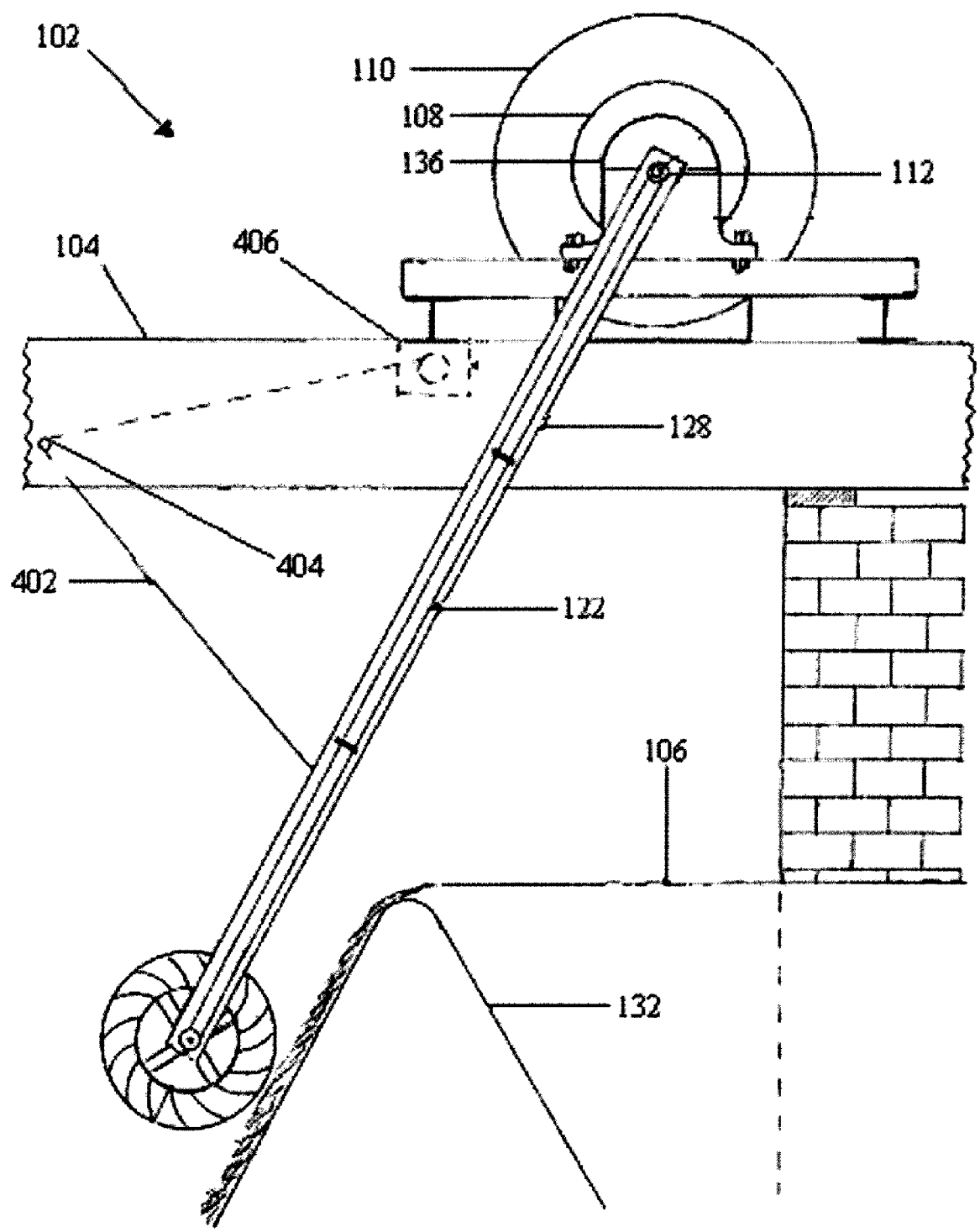
FIG. 5 illustrates a side view of the hydroelectric system according to an embodiment of the present invention.

FIG. 5 illustrates a side view of an embodiment of the present invention wherein the hydroelectric system 102 includes a support member 104, a gear arrangement 108, a generator 110, a drive member 112, a support arm 128, and a retraction mechanism 126. Different from the embodiment illustrated in FIG. 1, the embodiment in FIG. 5 depicts a retraction mechanism 126 including a retraction cable 402 affixed to the support arm 128 on one end of the retraction cable 402, a pulley 404, and a winding mechanism 406 such as a winch on the other end of the retraction cable 402. The retraction cable 402 may be any suitable material, including, for example, steel. FIG. 5 further differs from the embodiment in FIG. 1 wherein the spillway deflector 138 is omitted.

Figure 6:
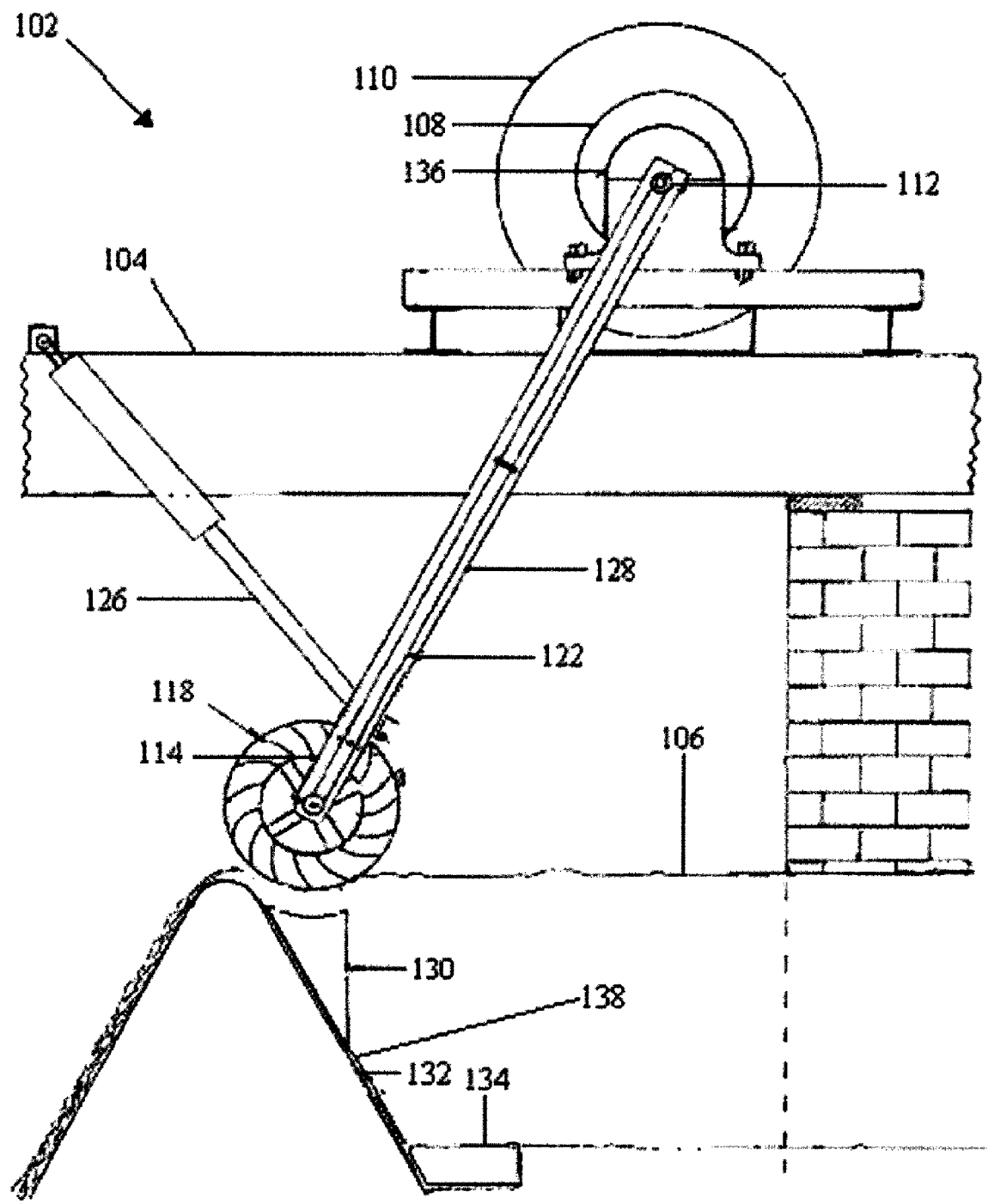
FIG. 6 illustrates a side view of the hydroelectric system according to an embodiment of the present invention.

FIG. 6 illustrates a side view of an embodiment of the present invention wherein the hydroelectric system 102 includes a support member 104, a gear arrangement 108, a generator 110, a drive member 112, a support arm 128, and a retraction mechanism 126. In FIG. 6, the water driven mechanism is located at the surface of the flowing water just prior to the apex of the dam or spillway 132. This configuration permits increased head flow and, therefore, increased amount of rotational torque. In addition, this configuration permits the water driven mechanism to be positioned for increased efficiency. In the embodiment illustrated in FIG. 6, the deflector wedge 130 of the spillway deflector 138 is located directly below the water driven mechanism, which is depicted as a water wheel structure 118.

Figure 7:
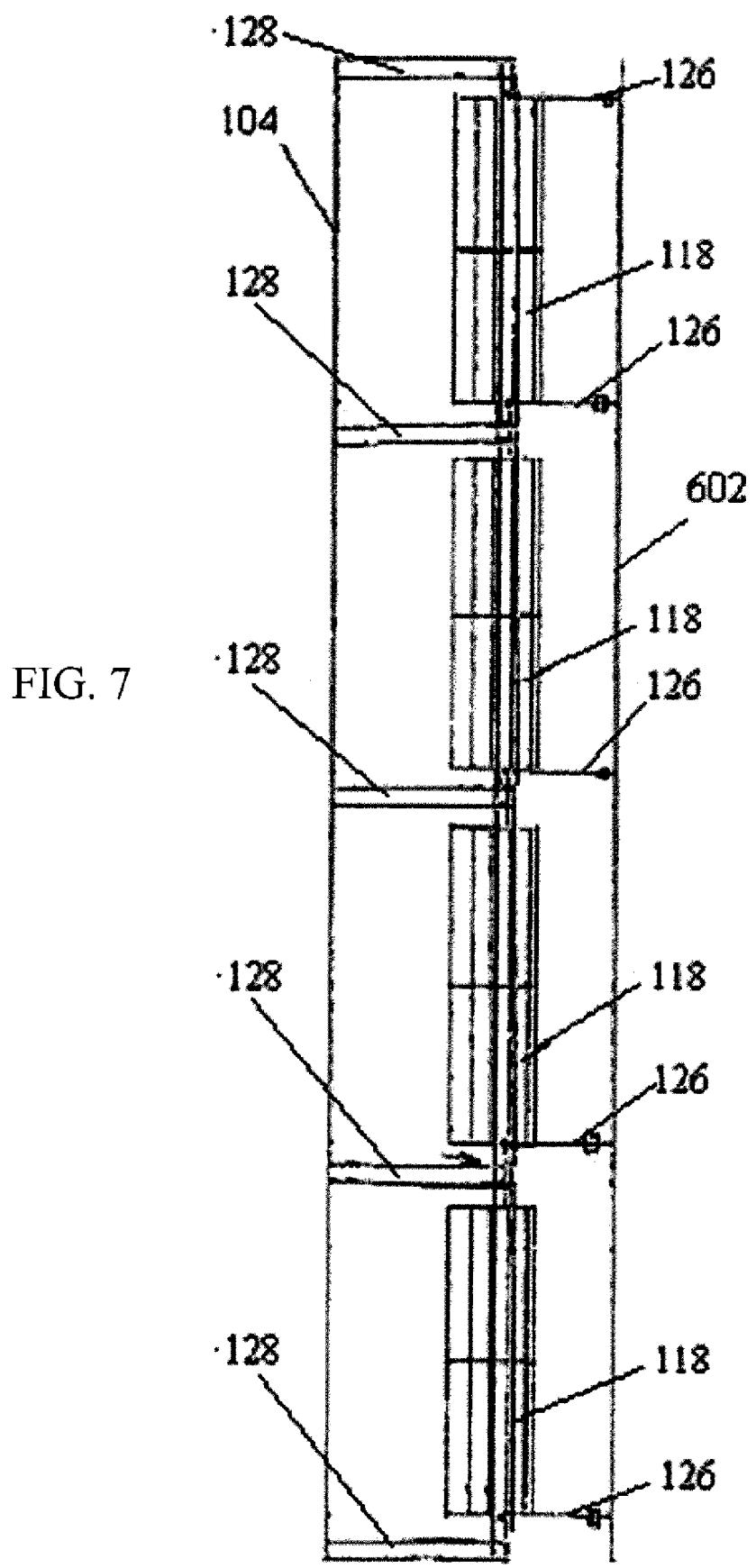
FIG. 7 illustrates a top view of multiple hydroelectric systems according to an embodiment of the present invention.

FIG. 7 illustrates a top view of an embodiment of the present invention including a plurality of water driven mechanisms, which are depicted as water wheel structures 118 connected in series. In this embodiment, the support member 104 is a steel post running parallel to the water wheels 118. The support member 104 is configured to permit the support arms 128 to pivotally attach to the support member 104. As in the embodiment discussed in FIG. 1, the support member 104 is configured to communicate the rotational torque of the water driven mechanism to the generator 110. As shown in FIG. 7, an additional support member, the retraction support member 602 is included in the hydroelectric system 102. The retraction support member 602 is depicted as a steel pipe running parallel to the water wheels 118. The retraction mechanism 126 is connected to the pipe or other support structure instead of the support member 104 in this embodiment. Pipe 602 may be fabricated from any suitable materials such as steel. In other embodiments, the embodiments described above, especially relating to FIGS. 1, 5, and 6, are arranged in a series including a plurality of water driven mechanisms.

Figure 8:
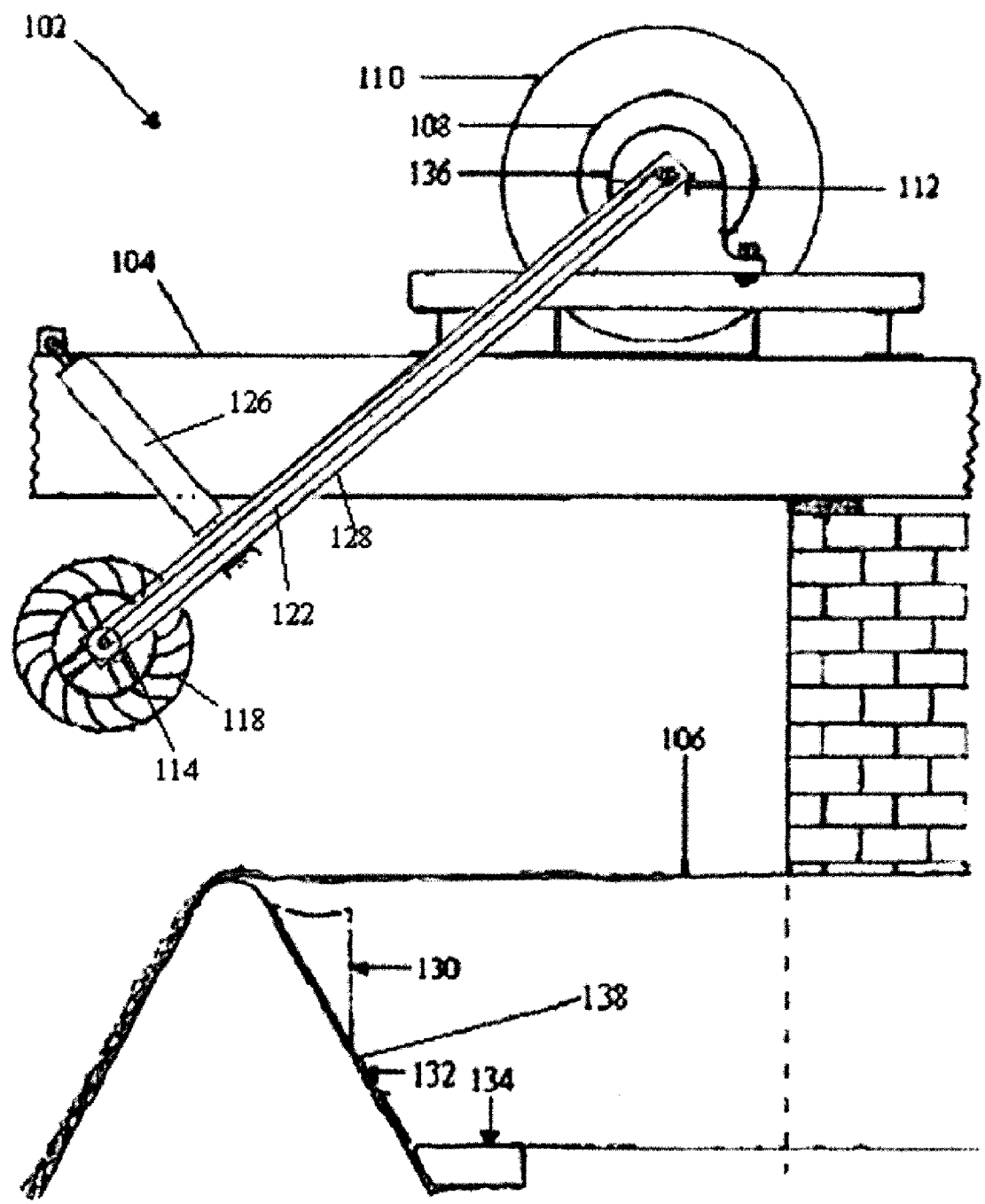
FIG. 8 illustrates a side view of the hydroelectric system according to an embodiment of the present invention.

FIG. 8 illustrates a side view of the hydroelectric system 102 according to an embodiment of the present invention. The embodiment shown in FIG. 8 includes an arrangement substantially identical to FIG. 1, wherein the support arm 128 is in a retracted position. In the embodiment illustrated by FIG. 8, the hydroelectric system 102 is retracted by means of the retraction mechanism 126. This retraction of the hydroelectric system 102 permits the system to avoid damage due to debris.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

The invention claimed is:

1. A hydroelectric generator arrangement comprising:
   a drive member being disposed at one end of a support arm, the drive member being operably connected to a generator;
   a water driven mechanism disposed along the support arm in rotational communication with the drive member;
   a retraction mechanism arranged and disposed to position the support arm; and
   a cradle bearing having a threading, the threading being attached to the drive member and being threadedly attached to the cradle bearing;
   wherein the cradle bearing permits the drive member to rotate, and
   wherein the cradle bearing permits the support arm to pivot.

2. The hydroelectric generator arrangement in claim 1, further comprising a flexible drive shaft configured to be in rotational communication with the water driven mechanism.

3. The hydroelectric generator arrangement in claim 1, further comprising a rotational torque converter comprising a gear arrangement arranged and disposed between a generator and the drive member; wherein the gear arrangement is configured to communicate rotational torque from the drive member to the generator.

4. The hydroelectric generator arrangement in claim 1, wherein the water driven mechanism is a water wheel.

5. The hydroelectric generator arrangement in claim 1, wherein the support arm is adjustable; and the adjustability permits positioning of the support arm in a substantially parallel relationship with a water stream.

6. The hydroelectric generator arrangement in claim 3, wherein the drive member is driven by the water flowing over a dam or spillway.

7. The hydroelectric generator arrangement in claim 1, wherein the retraction mechanism is a hydraulic arm pivotally mounted to the support arm and pivotally mounted to the support member.

8. The hydroelectric generator arrangement in claim 1, wherein the retraction mechanism comprises:
   cables affixed to the support arm;
   a winding mechanism housed on the support structure and attached to the cables;
   wherein the winding mechanism is configured to retract the cables thereby pivotally adjusting the support arm.

9. The hydroelectric generator arrangement in claim 1, wherein the gear arrangement is a wind system variable speed gear box.

10. The hydroelectric generator arrangement in claim 1, wherein the support arm comprises annular housing configured to transport heat from the generator to the water driven mechanism.

11. The hydroelectric generator arrangement in claim 1, further comprising a spillway deflector; wherein the spillway deflector comprises a deflector wedge, a deflector anchor, and a flat portion extending between the deflector anchor and the deflector wedge.

12. A hydroelectric system comprising:
   a drive member being disposed at one end of a support arm, the drive member being operably connected to a generator;
   a water driven mechanism disposed along the support arm in rotational communication with the drive member;
   a retraction mechanism arranged and disposed to position the support arm;
   a spillway or dam; and
   a spillway deflector; and
   a cradle bearing having a threading, the threading being attached to the drive member and being threadedly attached to the cradle bearing;
   wherein the cradle bearing permits the drive member to rotate, and
   wherein the cradle bearing permits the support arm to pivot.

13. The hydroelectric generator arrangement in claim 12, further comprising a rotational torque converter comprising a gear arrangement arranged and disposed between a generator and the drive member; wherein the gear arrangement is configured to communicate rotational torque from the drive member to the generator.

14. The hydroelectric system in claim 12, wherein the water driven mechanism is a water wheel.

15. The hydroelectric system in claim 12, wherein the support arm is adjustable;
   and the adjustability permits positioning the support arm in a substantially parallel relationship with a water stream.

16. The hydroelectric system in claim 12, wherein the retraction mechanism is:
   a hydraulic arm pivotally mounted to the support arm and pivotally mounted to the support member.

17. The hydroelectric system in claim 12, wherein the retraction mechanism comprises:
   cables affixed to the support arm at or near the second end of the support arm;
   a winding mechanism housed on the support structure and attached to the cables;
   wherein the winding mechanism is configured to retract the cables thereby pivotally adjusting the support arm.

18. The hydroelectric system in claim 12, wherein the spillway deflector comprises:
   a spillway deflector wedge;
   a deflector anchor; and
   a flat portion extending between the deflector anchor and the deflector wedge.

19. The hydroelectric system in claim 18, further comprising a chamber, wherein inflation of the chamber adjusts the angle of the spillway deflector wedge.

20. The hydroelectric system in claim 12, wherein the spillway deflector further comprises at least one cable extending between the deflector anchor and the deflector wedge.

21. The hydroelectric system in claim 12, wherein the spillway deflector further comprising:
   a first layer configured to resist debris;
   a second layer beneath the first layer; and
   a third layer beneath the second layer and abutting the dam or spillway;
   wherein the third layer is configured to resist abrasion from abutting the dam.

22. The hydroelectric system in claim 12, wherein the spillway deflector comprises material selected from the group consisting of rubberized polymers, plastic sheeting, recycled tires, and other synthetic materials.

* * * * *